April 20, 1954

T. DOUMA 2,676,295

ARRANGEMENT FOR TRANSFORMING A FIRST DIRECT
VOLTAGE INTO A SECOND DIRECT VOLTAGE

Filed June 30, 1951

INVENTOR
TJISKE DOUMA
BY
AGENT

Patented Apr. 20, 1954

2,676,295

UNITED STATES PATENT OFFICE 2,676,295

ARRANGEMENT FOR TRANSFORMING A FIRST DIRECT VOLTAGE INTO A SECOND DIRECT VOLTAGE

Tjiske Douma, San Carlos, Calif., assignor to Hartford National Bank and Trust Company, Hartford, Conn., as trustee Application June 30, 1951, Serial No. 234,504

Claims priority, application Netherlands July 21, 1950

7 Claims. (Cl. 321—2)

This invention relates to arrangements for transforming a first direct voltage into a second direct voltage having a different, more particularly a higher average voltage, consisting of at least first and second circuits which comprise a common capacitor and each comprises a series-connection of a controllable gas- or vapor-filled discharge tube and an inductor, the first direct voltage being applied to said first circuit at a point remote from the common capacitor while the second direct voltage is developed across the terminals of this capacitor. Such arrangements are known as in U. S. Patent specification 2,477,095, wherein the second direct voltage is supplied from the terminals of the capacitor through a rectifier and a smoothing filter to the load. The voltage supplied to the load exceeds that of the first direct voltage.

The invention is based on the recognition that this known arrangement can be simplified and, moreover, can be adapted to be controlled in such manner that a particular effect can be obtained.

According to the invention, the second direct voltage is taken directly from the terminals of the capacitor and the discharge tubes are governed to be controllable with different phase in respect to each other such that the polarity of the average direct voltage at the capacitor can be reversed from a controllable positive into a controllable negative value.

The periods of respective tube conduction current depend upon the self-inductance and capacitance in each circuit and last one half cycle of the natural frequency of each circuit, whereupon they are automatically extinguished. The instants of ignition of each tube are controllable in phase in relation to one another.

In order that the invention may be readily carried into effect, an example will now be described in detail with reference to the accompanying drawing.

Figure 1:
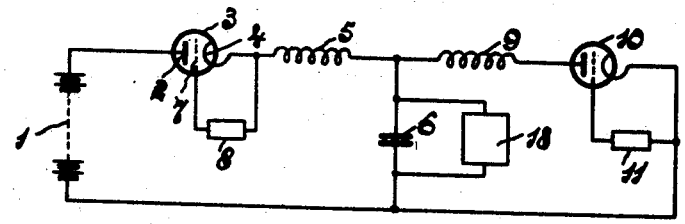
Figure 2:
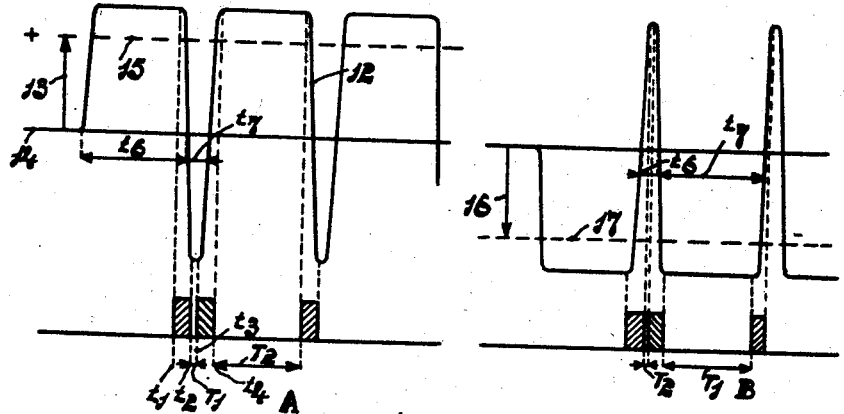

Fig. 1 is a wiring diagram of the arrangement according to the invention and, in Fig. 2, the output voltages are represented diagrammatically.

In Fig. 1, a source of direct voltage 1 is connected with its positive terminal to the anode 2 of a controllable gas- or vapor-filled discharge tube 3. A cathode 4 is connected through an inductor 5 to a capacitor 6, the other terminal of which is connected to the negative terminal of the source of direct voltage to complete the first circuit. A grid 7 is connected to the cathode by way of a control apparatus 8.

The capacitor 6 forms, at the same time, part of the second circuit which, furthermore, comprises an inductor 9 and a controllable gas- or vapor-filled discharge tube 10. The tube 10 is provided with a control apparatus 11.

If the tubes 3 and 10 are alternately ignited, an alternating voltage greatly exceeding the voltage of the direct current source 1 will be produced by building up in a manner known per se at the terminals of capacitor 6 (at least if the circuit losses are not excessively high). The voltage at the capacitor 6 may be represented diagrammatically as an alternating voltage with substantially rectangular positive and negative half waves, if the resonant frequencies of the two circuits are made sufficiently high. As long as the firing periods of the two tubes 3 and 10 are chosen to be equal, the positive and negative half cycles will be of equal duration, so that the average value of the voltage produced across capacitor 6 will be equal to zero.

In order to obtain a controllable positive or negative direct voltage at either of the terminals of capacitor 6, the firing periods of tubes 3 and 10 are chosen to be unequal. The result is shown in Fig. 2. If the tube 3 in Fig. 2A fires at the instant $t_1$, the tube will be extinguished after one half cycle of the natural frequency of the circuit 3—5—6 at the instant $t_2$. From the voltage curve 12 appears that the polarity of voltage at the capacitor is then reversed. If the tube 10 is ignited at the instant $t_3$ after a time $T_1$ and this tube is extinguished at the instant $t_4$, the polarity of the capacitor voltage is once more reversed. If tube 3 is again ignited after a longer time interval $T_2$ at the instant $t_5$, the voltage curve 12 is obtained, the average value 13 of which in relation to the zero line 14 is a direct voltage indicated by the dash line 15. The positive half waves then have a duration equal to $t_6$, and the negative half waves equal to $t_7$.

If, however, the time intervals $T_1$ and $T_2$ are chosen in reverse fashion, a negative average value 16 of the direct voltage 17 is obtained in relation to the zero line 14, as shown in Fig. 2B. Consequently, the polarity of the direct voltage at the terminals of capacitor 6 is then reversed in relation to the case shown in Fig. 2A. Furthermore, the average value of the direct voltage is controllable in accordance with the times chosen for $T_1$ and $T_2$. If, for example, $T_1$ in Fig. 2A is increased, the average value 13 decreases. Due to the de-ionization time of the discharge tubes, the time $T_1$ is bound to a minimum value, i. e. that in Figure 2A the de-ionization time of tube 3 must be shorter than $T_1$, since otherwise the tube 3 could again be ignited prematurely under the action of the anode voltage.

The controllable average direct voltage thus set up at the terminals of capacitor 6 may be supplied to a suitable load 18.

Figures 3, 4:
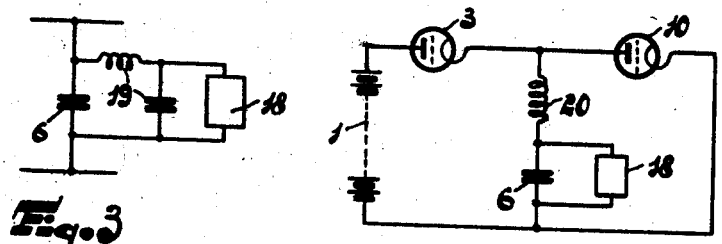

It is advisable that the load 18 should be connected to the capacitor 6 through a smoothing filter 19, for example as shown in Fig. 3, in order that the voltage curve may be free from ripple.

Fig. 4 shows an embodiment of the invention, wherein only one inductor 20 is also included in common in the two circuits. Otherwise, the operation of this arrangement corresponds to that of the arrangement shown in Fig. 1.

The arrangements described are adaptable to a wide variety of uses, where a comparatively high voltage with a comparatively low current strength is required.

What I claim is:

1. A device for transforming a first direct voltage into a second direct voltage having a higher average value, said device comprising a first circuit responsive to said first voltage and including a first gaseous discharge tube having a control electrode, a first inductance and an output capacitance, a second circuit including a second gaseous discharge tube having a control electrode, a second inductance and said output capacitance, said second voltage being developed across said output capacitance, and means to supply first and second control voltages to the control electrodes of said first and second tubes respectively to alternately render said tubes conductive, the first control voltage having a form igniting said first tube at spaced instants having a given recurrence rate, the second control voltage having a form igniting said second tube at spaced instants having the same rate but displaced in time relative to the instants of said first voltage to an extent at which the time interval between one instant in said first voltage and the succeeding instant in said second voltage is unequal to the time interval between said succeeding instant in said second voltage and the next instant in said first voltage.

2. A device for transforming a first direct voltage into a second direct voltage having a higher average value, said device comprising a first circuit responsive to said first voltage and including in serial connection a first gaseous discharge tube having a control electrode, a first inductance and an output capacitance, a second circuit including in serial connection a second gaseous discharge tube having a control electrode, a second inductance and said output capacitance, said second voltage being developed across said output capacitance, and means to supply first and second control voltages to the control electrodes of said first and second tubes respectively to alternately render said tubes conductive, the first control voltage having a form igniting said first tube at spaced instants having a given recurrence rate, the second control voltage having a form igniting said second tube at spaced instants having the same rate but displaced in time relative to the instants of said first voltage to an extent at which the time interval between one instant in said first voltage and the succeeding instant in said second voltage is unequal to the time interval between said succeeding instant in said second voltage and the next instant in said first voltage.

3. A device as set forth in claim 2 wherein said first and second inductances are constituted by a common inductance.

4. A device for transforming a first direct voltage into a second direct voltage having a different value, said device comprising a source of said first voltage, a first circuit connected across said source and including in serial connection a first gaseous discharge tube having a control electrode, a first inductance and an output capacitance, a second circuit including in serial connection a second gaseous discharge tube having a control electrode, a second inductance and said output capacitance, means to obtain said second voltage from said output capacitance, and means to supply first and second control voltages to the control electrodes of said first and second tubes respectively to alternately render said tubes conductive, the first control voltage having a form igniting said first tube at spaced instants having a given recurrence rate, the second control voltage having a form igniting said second tube at spaced instants having the same rate but displaced in time relative to the instants of said first voltage to an extent at which the time interval between one instant in said first voltage and the succeeding instant in said second voltage is unequal to the time interval between said succeeding instant in said second voltage and the next instant in said first voltage.

5. A device as set forth in claim 4 further including a load, a filter network, and means to supply said second voltage through said network to said load.

6. In combination; a source of direct voltage, a pair of gaseous discharge tubes each having a cathode, a control electrode and an anode, a pair of inductances, means connecting said inductances serially between the anode of one tube and the cathode of the other tube, means connecting the cathode of said one tube to the negative end of said source and the anode of said other tube to the positive end of said source, a capacitance connected between the junction of said serially connected inductances and said negative end of said source, means to apply a first control voltage to the control electrode of said one tube to ignite same at spaced instants having a given recurrence rate, and means to apply a second control voltage to the control electrode of said other tube to ignite same at spaced instants having the same rate but displaced in time relative to the instants of said first voltage to an extent at which the time interval between one instant in said first voltage and the succeeding instant in said second voltage is unequal to the time interval between said succeeding instant in said second voltage and the next instant in said first voltage, whereby a direct voltage is developed across said capacitance having a higher average value than that of said source.

7. In combination; first and second gaseous discharge tubes each having a cathode, a control electrode and an anode, an interconnection between the cathode of the first tube and the anode of the second tube, a direct voltage source having its positive end connected to the anode of the first tube and its negative end to the cathode of the second tube, an inductance, a capacitance connected in series with said inductance, the free end of said inductance being connected to said interconnection, the free end of said capacitance being connected to said negative end of said source, means to apply a control voltage to the control electrode of the first tube to ignite same at spaced instants having a given recurrence rate, and means to apply a control voltage to the control electrode of the second tube to ignite same at spaced instants having the same rate but displaced in time relative to that of said first voltage to an extent wherein the time interval between one instant in said first voltage and the succeeding instant in said second voltage is unequal to the time interval between said succeeding instant in said second voltage and the next instant in said first voltage, whereby a direct voltage is developed across said capacitance which is higher in average value than that of said source.

References Cited in the file of this patent

UNITED STATES PATENTS

| Number | Name | Date |
| --- | --- | --- |
| 1,752,247 | Fitzgerald | Mar. 25, 1930 |
| 1,919,976 | Fitzgerald | July 25, 1933 |
| 1,919,977 | Fitzgerald | July 25, 1933 |
| 1,959,374 | Lissman | May 22, 1934 |
| 2,267,233 | Elstrom | Dec. 23, 1941 |
| 2,555,305 | Alty | June 5, 1951 |